Jan. 14, 1964  A. G. STIMSON  3,117,506
MANUAL OVERRIDE FOR PHOTOELECTRIC EXPOSURE CONTROL IN CAMERA
Filed Aug. 9, 1961
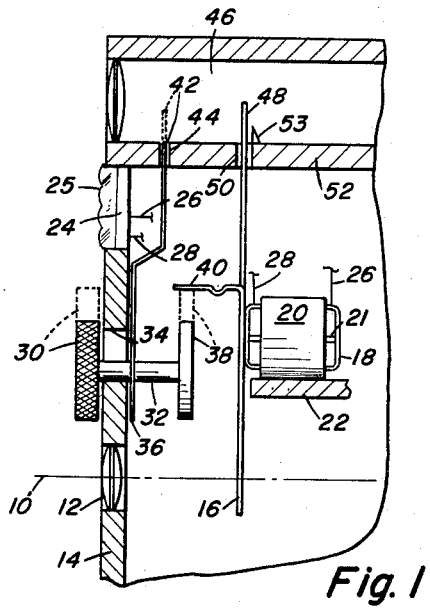
Fig. 1
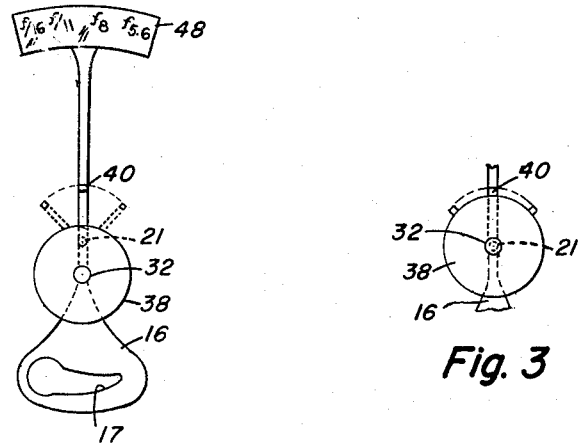
Fig. 2
Fig. 3
ALLEN G. STIMSON
INVENTOR.
BY R. Frank Smith
Robert W. Hampton
ATTORNEYS United States Patent Office 3,117,506
Patented Jan. 14, 1964

3,117,506
MANUAL OVERRIDE FOR PHOTOELECTRIC
EXPOSURE CONTROL IN CAMERA
Allen G. Stimson, Rochester, N.Y., assignor to Eastman Kodak Company, Rochester, N.Y., a corporation of New Jersey
Filed Aug. 9, 1961, Ser. No. 130,289
3 Claims. (Cl. 95—64)

The present invention relates to cameras having photoelectric exposure control systems and more particularly concerns means for manually overriding the photoelectric control and for selectively setting the exposure regulating system.

It is a primary object of the present invention to provide a simple, inexpensive and rugged manual override device for a photoelectric exposure control system.

A more specific object of the invention is to manually override the action of a photoelectric exposure control system by frictional engagement between a manually controlled member and a part of the photoelectrically controlled system, regardless of the position of the latter at the time of such engagement.

Other objects of the invention will appear from the following description, reference being made to the accompanying drawings, wherein:

FIG. 1 is a sectional right side view of a portion of a camera showing the invention;

FIG. 2 is a front view of the friction disk and the abutment member when the former is in its position for automatic exposure control; and FIG. 3 is a view similar to FIG. 2 with the friction member in its position for manual diaphragm adjustment.

Referring to FIG. 1, a typical camera embodying the present invention has a taking lens axis 10 on which is disposed a lens system, illustrated at 12, supported by a front cover or other frame member 14 of the camera. An exposure regulating member, illustrated in FIG. 2 as a diaphragm vane 16, and which may be of the type disclosed in U.S. Patent 2,163,737 to Prinsen, crosses the lens axis and may be moved for varying the alignment of a tapered vane aperture 17 with the lens axis, thereby varying the exposure aperture in a manner well known in the art. Vane 16 is secured to a movable coil 18 of an electric measuring instrument 20. The coil is pivoted about an axis 21 and is energized by a photocell 24 through electric leads 26 and 28. The photocell is positioned in the camera front for exposure to field light through a lens block 25 and energizes the instrument coil 18 as a function of field brightness, thereby automatically positioning the diaphragm vane 16 and its aperture 17 for regulating exposure of film in the camera.

The above-mentioned manual override is accomplished by control means comprising shaft 32, knob 30, and friction disk 38. The knurled knob 30, secured to the shaft 32, is disposed outside of the front camera cover 14 for access by the camera operator. Shaft 32 extends through an elongated slot 34 in cover 14 and extends through a plate 36, which is adapted for vertical sliding movement with the shaft. Plate 36 and knob 30 are in frictional engagement with opposite sides of cover member 14 and maintain shaft 32 in any position where it is placed by angular or vertical movement of knob 30. The friction disk 38, which may be formed of felt, sponge rubber or the like, is mounted on shaft 32 for angular and vertical movement therewith. When knob 30 is in its downward position as shown in FIGS. 1 and 2, the friction disk 38 lies outside the path of a spring abutment member 40, which is integral with vane 16 or is otherwise secured to coil 18. In this relative position of the elements, the spring abutment member 40 is movable through the path shown in FIG. 2 in response to movement of vane 16 for automatically regulating exposure.

In order to regulate exposure manually, knob 30 is moved upwardly from the position shown in solid lines in FIG. 1 to the position there shown in broken lines. This moves shaft 32 upwardly until it is substantially coaxial with the pivot 21 of coil 18, which moves the periphery of the friction disk 38 into engagement with the spring abutment member 40, regardless of the angular position that the latter occupies at the time of such engagement. Subsequent angular movement of knob 30 effects a corresponding angular movement of coil 18 and vane 16 for setting the latter to any desired position. The position of vane 16 may be noted by the operator by means of an indicator 48, which is integral with vane 16 and extends into a viewfinder 46 through an aperture 50 in a frame member 52. Indicator 48 may be a transparent scale member of the type shown in FIG. 2, cooperating with a fixed index mark 53.

When knob 30 is raised to its upper position, as shown in FIG. 3, an arm 42, which is integral with plate 36 and extends through an aperture 44 in frame member 52, moves from the position shown in solid lines in FIG. 1 to the position there shown in broken lines, and is visible in the viewfinder to indicate that the diaphragm being regulated is under manual control.

The invention has been described in detail with particular reference to preferred embodiments thereof, but it will be understood that variations and modifications can be effected within the spirit and scope of the invention as described hereinabove and as defined in the appended claims.

I claim:

1. In a camera having a photoelectric exposure control system including an exposure regulating device angularly movable about a pivot within a predetermined range, as a function of field brightness, means for regulating exposure manually, comprising in combination: an abutment member angularly movable with said regulating member within said range; a camera frame member arranged near said abutment member and formed to define an elongated apertured guideway; and manually adjustable control means including a shaft extending through said frame member and oriented in substantially parallel relation with the rotational axis of said regulating device, said shaft being mounted in and frictionally engaging the edges of said guideway so as to be angularly and slidably movable within said guideway and adapted to be held in any manually set angular or slidable position by said frictional engagement, said control means further including a knob fixed to and movable with said shaft, said knob being accessible to the camera operator, and said control means further including a friction disk secured to said shaft for angular and slidable movement therewith and having a first guideway position lying outside the range of movement of said abutment member and having a second guideway position wherein said disk is substantially coaxial with and engages said abutment member, regardless of the pivotal position of the latter at the time of said engagement, whereby subsequent angular movement of said knob and friction disk pivots said abutment member to any selected position within said range.

2. The combination defined in claim 1, with: a viewfinder on said camera, and a signal controlled by said knob control member, upon slidable movement of the latter, for moving said signal into a position where it it visible in said viewfinder.

3. The combination defined in claim 1, with: a viewfinder in said camera; and a scale member visible in said view-finder and movable under control of said regulating device for indicating the position of the latter.

References Cited in the file of this patent

UNITED STATES PATENTS

| | | |
|---|---|---|
| 2,923,170 | Pfaffenberger | Feb. 2, 1960 |
| 3,033,093 | Stimson et al. | May 8, 1962 |